(12) United States Patent
His et al.

(10) Patent No.: US 9,023,288 B2
(45) Date of Patent: May 5, 2015

(54) FLUSH JOINT

(75) Inventors: Christian His, Cavaillon (FR);
Franceline Villermaux, Avignon (FR);
Guillaume Belly, Isle sur la Sorgue (FR)

(73) Assignee: Saint-Gobain Centre de Recheches et d'Etudes European, Courbevoie (FR)

( * ) Notice: Subject to any disclaimer, the term of this patent is extended or adjusted under 35 U.S.C. 154(b) by 858 days.

(21) Appl. No.: 13/203,158

(22) PCT Filed: Feb. 24, 2010

(86) PCT No.: PCT/IB2010/050811
§ 371 (c)(1),
(2), (4) Date: Sep. 20, 2011

(87) PCT Pub. No.: WO2010/097765
PCT Pub. Date: Sep. 2, 2010

(65) Prior Publication Data
US 2012/0001422 A1    Jan. 5, 2012

(30) Foreign Application Priority Data

Feb. 24, 2009  (FR) ..................... 09 51175

(51) Int. Cl.
*F16L 13/00* (2006.01)
*C10G 9/16* (2006.01)
(Continued)

(52) U.S. Cl.
CPC ............... *F16L 13/004* (2013.01); *C10G 9/16* (2013.01); *C10G 9/203* (2013.01); *F16L 49/00* (2013.01); *F28F 9/26* (2013.01); *F28F 21/04* (2013.01); *F28F 21/08* (2013.01); *F28F 2275/127* (2013.01); *C04B 37/026* (2013.01); *C04B 2235/77* (2013.01); *C04B 2235/9607* (2013.01); *C04B 2237/06* (2013.01); *C04B 2237/062* (2013.01); *C04B 2237/064* (2013.01); *C04B 2237/066* (2013.01); *C04B 2237/068* (2013.01); *C04B 2237/122* (2013.01); *C04B 2237/123* (2013.01); *C04B 2237/125* (2013.01); *C04B 2237/126* (2013.01); *C04B 2237/127* (2013.01); *C04B 2237/341* (2013.01);
(Continued)

(58) Field of Classification Search
USPC ............ 422/240, 629, 310; 285/381.1, 381.3, 285/239; 403/273
See application file for complete search history.

(56) References Cited

U.S. PATENT DOCUMENTS 2,272,210 A    2/1942  King
3,052,573 A    9/1962  Dumesnil
(Continued)

FOREIGN PATENT DOCUMENTS

DE    10 2005 054 093 A1    6/2006
EP            1 044 944 A1    10/2000
(Continued)

OTHER PUBLICATIONS

Office Action dated May 3, 2013 issued in U.S. Appl. No. 13/203,115.
(Continued)

*Primary Examiner* — Lessanework Seifu
(74) *Attorney, Agent, or Firm* — Oliff PLC (57) ABSTRACT

A device including a first part made of ceramic material shrink fitted with a first shrink ring, in which an edge of an axial end of a cylindrical portion of the first part to which the first shrink ring is fitted and an edge of an axial end of the first shrink ring belong to one and the same transverse plane.

22 Claims, 3 Drawing Sheets

(51) Int. Cl.

| | | |
|---|---|---|
| *C10G 9/20* | (2006.01) | |
| *F16L 49/00* | (2006.01) | |
| *F28F 9/26* | (2006.01) | |
| *F28F 21/04* | (2006.01) | |
| *F28F 21/08* | (2006.01) | |
| *C04B 37/02* | (2006.01) | |

(52) U.S. Cl.
CPC .... *C04B 2237/343* (2013.01); *C04B 2237/346* (2013.01); *C04B 2237/348* (2013.01); *C04B 2237/365* (2013.01); *C04B 2237/368* (2013.01); *C04B 2237/403* (2013.01); *C04B 2237/405* (2013.01); *C04B 2237/406* (2013.01); *C04B 2237/592* (2013.01); *C04B 2237/708* (2013.01); *C04B 2237/72* (2013.01); *C04B 2237/765* (2013.01); *C04B 2237/82* (2013.01); *C04B 2237/84* (2013.01)

(56) References Cited

U.S. PATENT DOCUMENTS

| | | | |
|---|---|---|---|
| 4,624,484 A | 11/1986 | Wilson | |
| 5,108,523 A | 4/1992 | Peterseim et al. | |
| 5,687,995 A | 11/1997 | Mori et al. | |
| 6,431,781 B1 * | 8/2002 | Schenk | 403/29 |
| 7,482,502 B2 * | 1/2009 | Brown et al. | 585/652 |
| 7,857,194 B2 * | 12/2010 | Kramer | 228/122.1 |
| 2002/0025454 A1 | 2/2002 | Wang et al. | |
| 2003/0155047 A1 * | 8/2003 | Magoshi et al. | 148/428 |
| 2008/0274362 A1 | 11/2008 | Kramer | |
| 2009/0004369 A1 | 1/2009 | Inaba et al. | |
| 2012/0001417 A1 | 1/2012 | His et al. | |
| 2012/0001421 A1 | 1/2012 | His et al. | |
| 2012/0003128 A1 | 1/2012 | His et al. | |

FOREIGN PATENT DOCUMENTS

| | | |
|---|---|---|
| EP | 1 795 794 A1 | 6/2007 |
| EP | 1 829 847 A2 | 9/2007 |
| FR | 2 562 983 A1 | 10/1985 |
| FR | 2 645 941 A1 | 10/1990 |
| GB | 1159980 | 7/1969 |
| JP | A-58-130547 | 8/1983 |

OTHER PUBLICATIONS

Aug. 30, 2011 Written Opinion issued in International Application No. PCT/IB2010/050813 with English-language translation.
May 28, 2010 International Search Report issued in International Application No. PCT/EB2010/050813.
Aug. 30, 2011 Written Opinion issued in International Application No. PCT/IB2010/050809 with English-language translation.
May 28, 2010 International Search Report issued in International Application No. PCT/IB2010/050809.
Aug. 30, 2011 Written Opinion issued in International Application No. PCT/IB2010/050811 with English-language translation.
May 28, 2010 International Search Report issued in International Application No. PCT/IB2010/050811.
Aug. 30, 2011 Written Opinion issued in International Application No. PCT/IB2010/050810 with English-language translation.
May 3, 2010 International Search Report issued in International Application No. PCT/IB2010/050810.
Jan. 15, 2015 Office Action issued in U.S. Appl. No. 13/203,077.
Vascotube, "Nitinol Tube", 2013, http://www.vascotube.com/nitinol-tube.
"Thermal and Physical Properties of Pure Metals'", 2015, CRC Handbook of Chemistry and Physics, 95th Ed., pp. 12-206-12-207.
"Thermal Conductivity of Ceramics and Other Insulating Materials", CRC Handbook of Chemistry and Physics, 95th Ed., pp. 12-214-12-215.

* cited by examiner

FLUSH JOINT

TECHNICAL FIELD

The invention relates in particular to an item of equipment chosen from a furnace, a boiler, a superheater, a steam generator, a chemical reactor and a heat exchanger, intended in particular for the production of ethylene. In particular, it relates to means for providing or improving an end-to-end connection between a tube made of ceramic (in particular of silicon carbide) and a metal tube, with or without direct contact between the two tubes.

STATE OF THE ART

The production of ethylene results conventionally from a steam cracking operation starting from ethane or naphtha. To this end, an ethylene production unit 5, as represented diagrammatically in FIG. 1, conventionally comprises a furnace 10 comprising a chamber 11 through which passes a bundle of tubes 12 and which is heated by at least one burner 13.

Figure 1:
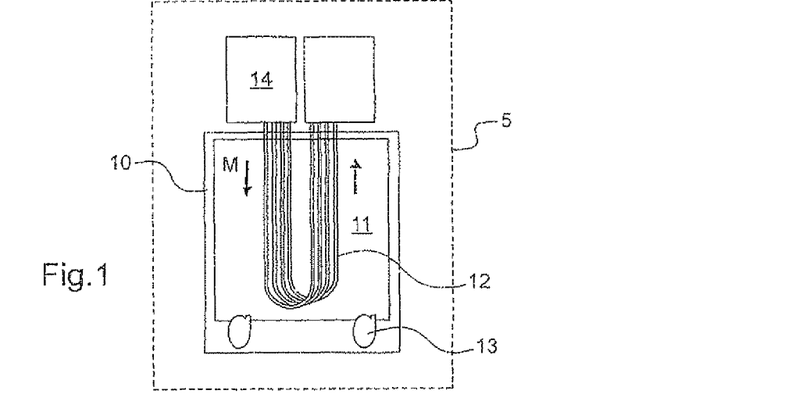
FIG. 1 diagrammatically represents an ethylene production unit.

The tubes 12, of circular cross section, exhibit an external diameter of between 50 and 250 mm and a wall with a thickness of between 5 and 25 mm. These tubes, bent into a pin, exhibit a length inside the chamber of the furnace of several meters. They are made of an alloy of iron, nickel and chromium.

In order to produce ethylene, feed means 14 feed an upstream end of the tubes 12 with a reactive mixture M of hydrocarbons and of steam, a temperature of greater than 1000° C. being maintained in the chamber 11. The flow rate of this mixture is adjusted so that the reactive mixture M can reach a temperature of greater than 750° C. and can react to result in the production of ethylene.

The production of ethylene results in a deposition of coke on the internal surfaces of the tubes 12, bringing about a fall in productivity.

In particular, it has been discovered that the nickel of the alloy forming the tubes catalyzes the production of coke. Researchers have thus envisaged replacing the metal tubes by nickel-free tubes, in particular ceramic tubes. The ceramic tubes have to be able to be connected to the remainder of the plant and in particular to metal tubes used to introduce the reactive mixture or to discharge the reaction products. Research studies have thus been carried out in order to find suitable connecting devices, in particular devices capable of withstanding the thermal cycles, typically with an amplitude of more than 700° C., which result from the shutdowns of the furnaces.

In particular, the ceramic tubes and the metal tubes exhibit very different thermal expansion coefficients, typically of approximately $4.10^{-6}$ $K^{-1}$ and of approximately $18.10^{-6}$ $K^{-1}$ respectively. In the applications targeted, the connections tested result in losses in leaktightness, indeed even in separation of the tubes.

For example, FR 2 645 941 describes a connecting device between a metal support and a ceramic tubular element in which a collar is attached to the support and surrounds the ceramic tube with a functional clearance. The leaktightness is obtained by a coke seal resulting from the operation of the production unit. However, this functional clearance results, at the startup of the production unit, in escapes of hydrocarbons.

In addition, the connection is not mechanically reliable, in particular at ambient temperature. It is thus not suitable for an environment such as that of an ethylene production furnace.

Furthermore, decoking cannot be carried out with steam but necessarily has to result from mechanical abrasion.

Finally, the connecting device described in FR 2 645 941 can only be applied in plants which generate coke.

SUMMARY OF THE INVENTION

There thus exists a need for a novel connecting device, suitable in particular for the connection of a ceramic tube with a metal tube in an environment such as that of an ethylene production furnace, but without being limited thereto.

An object of the invention is thus to respond, at least partially, to this need.

First Aspect of the Invention

According to a first aspect of the invention, this aim is achieved by means of a device comprising a first part shrink fitted by means of a first shrink ring, the first shrink ring being itself shrink fitted by means of a second shrink ring exhibiting a lower thermal expansion coefficient than the thermal expansion coefficient of the first shrink ring, at least between 20° C. and 1000° C.

At ambient temperature, the shrink rings provide a reliable mechanical connection and good leaktightness. During a rise in the temperature, the second shrink ring expands less than the first shrink ring. It thus exerts, on the latter, a compressive force which prevents it from becoming detached from the first part or a loss in leaktightness between the first part and the first shrink ring.

As will be seen in more detail in the continuation of the description, when the first part is a ceramic tube, it thus becomes possible, by attaching a metal tube to the first shrink ring, to obtain a connection between the ceramic tube and the metal tube which is particularly reliable mechanically. This connection can advantageously be sufficiently leaktight, in particular for the targeted applications, not only at ambient temperature but also over a temperature range of several hundred degrees, typically of more than 700° C., of more than 800° C., indeed even of more than 900° C.

A device according to the invention can also comprise one or more of the following optional characteristics:

- The first part is made of a material exhibiting a thermal expansion coefficient of less than $10.10^{-6}$ $K^{-1}$, of less than $8.10^{-6}$ $K^{-1}$, of less than $6.10^{-6}$ $K^{-1}$ or indeed even of less than $5.10^{-6}$ $K^{-1}$, between 20° C. and 1000° C.
- The first part is made of a material exhibiting a modulus of elasticity (MOE) of greater than 150 GPa.
- The first part is made of a ceramic, carbide, nitride or oxide material capable of withstanding temperatures reaching 1400° C., indeed even 1500° C.
- The first part comprises a ceramic or vitroceramic material. This material can in particular be chosen from silicon carbide, alumina, mullite, silicon nitride, zirconia, cordierite, aluminum titanate and their mixtures.
- The amount by weight of silicon carbide in the material of the first part is greater than 80%, preferably greater than 90%. Preferably, said material is composed of silicon carbide. Silicon carbide exhibits properties which are of particular use in the application targeted. In particular, it makes it possible to limit the formation of coke and exhibits a high thermal conductivity, allowing efficient transfer of the heat from the furnace to the reactive mixture moving through the tubes. The energy efficiency is thus better than that obtained with a corresponding metal tube. Finally, silicon carbide, the maximum operating temperature of which is greater than 2000° C., retains its mechanical properties, even at very high temperature. Advantageously, it thus becomes possible to increase the temperature inside the furnace and, simultaneously, to increase the flow rate of the mixture of reactants moving through the tubes. The productivity of the furnace can thus be considerably increased.

The material of the first part exhibits a total porosity of less than 5%, preferably of less than 2%, indeed even of less than 1%. Advantageously, the permeability of the first part is thereby reduced.

The first shrink ring comprises a metal. Preferably, the first shrink ring is composed of one or more metals. In one embodiment, it comprises a ferrous metal.

The first shrink ring is made of a material exhibiting a thermal expansion coefficient of less than $25.10^{-6}$ $K^{-1}$, of less than $20.10^{-6}$ $K^{-1}$ and/or of greater than $10.10^{-6}$ $K^{-1}$, or of greater than $15.10^{-6}$ $K^{-1}$, between 20° C. and 1000° C.

The first shrink ring is made of a material exhibiting a melting point of greater than 1200° C. Advantageously, the first shrink ring can thus be heated to a very high temperature in order to be fitted to the first part and/or during its use.

The material of the first shrink ring is chosen from cobalt-based alloys, such as Stellite, austenitic steels, ferritic steels or titanium-based alloys. In one embodiment, the first shrink ring does not comprise copper and/or does not comprise tin.

The first shrink ring is composed of just one material.

The first shrink ring exhibits the shape of a collar or of a sleeve, the radial thermal expansion of which is not impeded. In particular, the first shrink ring is not inserted into a part which would impede its radial expansion outward. The fitting of the first shrink ring is thereby simplified.

The ratio of the thermal expansion coefficient of the material of the first shrink ring to the thermal expansion coefficient of the material of the first part, which are measured at a temperature between 20° C. and 1000° C., is greater than 2.5, greater than 3, greater than 4 and/or less than 6, indeed even less than 5.

The second shrink ring is made of a material exhibiting a thermal expansion coefficient of less than $15.10^{-6}$ $K^{-1}$, indeed even of less than $10.10^{-6}$ $K^{-1}$, and/or of greater than $4.10^{-6}$ $K^{-1}$, indeed even of greater than $6.10^{-6}$ $K^{-1}$, between 20° C. and 1000° C. The material of the second shrink ring can in particular exhibit a thermal expansion coefficient of $8.10^{-6}$ $K^{-1}$ between 20° C. and 1000° C.

The second shrink ring is made of a material exhibiting a melting point of greater than 1200° C. Advantageously, the second shrink ring can thus be heated to a very high temperature in order to be fitted to the first shrink ring, which makes it possible to obtain a particularly tight connection.

The ratio of the thermal expansion coefficient of the material of the first shrink ring to the thermal expansion coefficient of the material of the second shrink ring, between 20° C. and 1000° C., is greater than 1.2, greater than 1.5, greater than 1.8 and/or less than 3.5, less than 3, indeed even less than 2.5.

The second shrink ring is made of a material exhibiting a modulus of elasticity (Young's modulus) at 20° C. of less than 110 GPa, preferably of less than 100 GPa. The material of the second shrink ring can in particular exhibit a modulus of elasticity (Young's modulus) of 90 GPa at 20° C.

The material of the second shrink ring exhibits a content by weight of niobium and/or of Dilver P1 of greater than 80%, preferably of greater than 85% and/or of less than 95%, preferably of less than 93%. Advantageously, the presence of niobium makes it possible to obtain a dilatometric behavior which is particularly well suited when the device is used for the production of ethylene. Dilver P1 can advantageously be used when the device according to the invention is not subjected in service to temperatures of greater than 600° C. Under these temperature conditions, niobium is preferably completely replaced by Dilver P1. The modification to the content of niobium and/or of Dilver P1 also makes it possible to precisely adjust the thermal expansion coefficient to the targeted application.

The material of the second shrink ring exhibits a content by weight of hafnium, in the metal form, of greater than 5%, preferably of greater than 8%, and/or of less than 15%, preferably of less than 12%. Advantageously, the presence of hafnium improves the high-temperature mechanical strength.

The material of the second shrink ring exhibits a content by weight of titanium, in the metal form, of greater than 0.5%, preferably of greater than 0.8%, and/or of less than 1.5%, preferably of less than 1.2%. Advantageously, the presence of titanium improves the ductility and the resistance to oxidation.

The material of the second shrink ring is composed of niobium and/or of Dilver P1, of hafnium and of titanium, the remainder to 100% being impurities representing less than 2%, preferably less than 1%, as percentages by weight.

The second shrink ring is composed of just one material.

The second shrink ring exhibits the shape of a collar or of a sleeve, the radial thermal expansion of which is not impeded. In particular, the second shrink ring is not inserted into a part which would impede its radial expansion outward. The fitting of the second shrink ring is thereby simplified.

The first shrink ring and/or the second shrink ring extends over a length of greater than 40 mm and/or of less than 150 mm.

The first shrink ring exhibits a thickness, preferably a substantially constant thickness, of greater than 1 mm, preferably of greater than 3 mm, more preferably of greater than 3.5 mm, and/or of less than 5 mm and/or the second shrink ring exhibits a thickness, preferably a substantially constant thickness, of greater than 3 mm, preferably of greater than 5 mm, preferably of greater than 8 mm, and/or of less than 15 mm, preferably of less than 13 mm. These lengths and thicknesses have proved to be optimal for ensuring good leaktightness of the connection.

A second part is attached to the first shrink ring.

The second part is made of a material exhibiting a thermal expansion coefficient of less than $25.10^{-6}$ $K^{-1}$ or of less than $20.10^{-6}$ $K^{-1}$ and/or of greater than $10.10^{-6}$ $K^{-1}$ or of greater than $15.10^{-6}$ $K^{-1}$, between 20° C. and 1000° C. A device according to the invention is in particular perfectly suitable for connecting the first and second parts exhibiting very different thermal expansion coefficients.

The material of the second part is metallic. In particular, this material can be chosen from cobalt-based alloys, such as Stellite, austenitic steels, ferritic steels, indeed even ferrous steels, or titanium-based alloys.

The second part is made of a material exhibiting a thermal expansion coefficient and/or a chemical composition which is/are substantially identical to that/those of the first shrink ring.

The second part is welded or brazed to the first shrink ring. The use of a weld or of a braze advantageously makes possible reliable attachment, even at high temperature. It is particularly well suited when the materials of the second part and of the first shrink ring are similar, indeed even identical, in composition.

The openings of the first shrink ring and/or of the second shrink ring is/are cylindrical with a circular cross section. In other words, the first part exhibits, externally, a circular cylindrical portion to which the first shrink ring is fitted and/or the first shrink ring exhibits, externally, a circular cylindrical portion to which the second shrink ring is fitted. The first and second shrink rings can in particular exhibit the general shape of collars.

The inside of the first part and/or of the second part is solid, hollow or partially solid. The hollow internal volume can be of any shape.

The first part and/or, if appropriate, the second part are chosen from a tube and a solid bar.

The tube and/or the bar exhibit(s) a length of greater than 1 m, preferably of greater than 3 m.

The greatest transverse external dimension of said tube or of said bar (that is to say, the external diameter in the case of a circular cross section), upstream and/or downstream of the connecting device, is greater than 10 mm, preferably greater than 20 mm, greater than 30 mm, greater than 40 mm and/or less than 150 mm, less than 100 mm, less than 75 mm.

In a transverse cross section of said tube, upstream or downstream and/or in the connecting device, the outline of the internal surface is identical in shape to or different in shape from the outline of the external surface of said tube. For example, the internal surface may exhibit grooves or ruggednesses or be polygonal, for example square, and the external surface may be circular.

In a transverse cross section of the first shrink ring, the outline of the internal surface of the first shrink ring is identical in shape to or different in shape from the outline of its external surface.

A third part is attached to said second part.

The device comprises neither screws nor bolts. This is because these parts are liable to break under the effect of an encrustation of coke in their threads.

The first part is a ceramic tube or a solid ceramic bar and/or, if appropriate, the second part is a metal tube or a solid metal bar.

In one embodiment, the first and second parts are first and second tubes axially aligned. Preferably, they are fitted end to end, preferably without contact with one another.

In one embodiment, the first shrink ring projects from the first part, that is to say, in the case where the first part is a tube or a bar, extends beyond the axial end of the first part to which it is fitted, and the second shrink ring does not project from the first part, indeed even is fitted flush to the first part.

In one embodiment, said first and second tubes exhibit the same internal diameter.

Preferably, said first and second tubes are axially distant from one another by less than 5 mm, less than 3 mm or less than 1 mm.

The first and/or second parts are tubes which preferably extend over a length (along the axis of the tube) of greater than 10 cm, of greater than 50 cm, indeed even of greater than 1 m, beyond the axial end of the first shrink ring extending in said transverse plane.

The first part is a ceramic tube, preferably extending along a substantially vertical axis, and the second part is a metal tube. The ceramic tube can in particular exhibit a length of greater than 1 meter, of greater than 5 meters, indeed even of greater than 8 meters. The metal tube can in particular exhibit a rectilinear axis and a position coaxially in the extension of the ceramic tube. In an alternative form, the metal tube can be angled, indeed even be U-shaped. In one embodiment, the two branches of the U are connected to ceramic tubes, on each occasion by means of a connecting device according to the invention.

The first and second parts can have any conformation. However, at the connecting device, the dimensions of the second part must allow it to be attached to the first shrink ring, itself attached externally to the first part.

In one embodiment in which the first and second parts are tubes exhibiting, over their entire length, including at the connecting device, an external diameter and a wall thickness which are substantially constant, this requirement thus results in a reduction in the passage cross section at the transition between the second part and the first part.

This is why, preferably, the first and second parts are tubes (or bars) exhibiting, over their entire length, a constant external diameter except, as regards the second part, at the connecting device. In this embodiment, such as that represented in FIG. 3, the second part is thus a tube exhibiting a broadened axial end, for example in the form of a cylindrical skirt, the dimensions of which are adjusted in order for it to be able to be used for the attaching to the first shrink ring.

The broadened axial end can be integral with the remainder of the tube. The practical preparation of a second part exhibiting such a conformation may, however, be problematic. In one embodiment, said broadened axial end is thus attached to a conventional tube (with a constant diameter over its entire length) in the form of a junction part. For example, a skirt exhibiting an internal diameter greater than the internal diameter of such a tube can be welded to one end of said tube.

Advantageously, the passage cross section can thus be kept constant, whatever the axial position under consideration (upstream, downstream or in the connecting device).

The use of a junction part is particularly effective when the second part is a solid bar.

The above characteristics and those of the other aspects of the invention which are described below are advantageously incorporated together in one and the same device in order to obtain an optimal connection, although, in some cases, the advantages which result from these characteristics may be taken advantage of separately from the others, in different devices.

The invention also relates to a process for joining a first part made of a material exhibiting a first thermal expansion coefficient and a second part made of a material exhibiting a second thermal expansion coefficient greater than said first thermal expansion coefficient, said process comprising the following stages:

1) shrink fitting a first shrink ring to the first part;
2) shrink fitting a second shrink ring to the first shrink ring, said second shrink ring being made of a material exhibiting a thermal expansion coefficient which is lower than the thermal expansion coefficient of the first shrink ring;
3) independently of stage 1) or stage 2), preferably after stage 2), attaching the second part to the first shrink ring.

Preferably, the first part, the second part, the first shrink ring and the second shrink ring are chosen so as to obtain, on conclusion of stage 3), a device in accordance with the invention, according to any one of its aspects.

The invention also further relates to a process for adapting a shrink ring to an environment exhibiting a specific variability in temperature, for example with an amplitude of greater than 200° C., of greater than 400° C., of greater than 700° C., indeed even of greater than 900° C., said process consisting in modifying the composition of said shrink ring, in particular in modifying the content of niobium and/or of Dilver P1.

The shrink ring can in particular exhibit one or more characteristics, possibly optional, of a second shrink ring according to any one of the aspects of the invention. The material of the shrink ring can in particular exhibit a content by weight of niobium and/or of Dilver P1 of greater than 80%, preferably of greater than 85%, and/or of less than 95%, preferably of less than 93%.

Second Aspect of the Invention

The fitting of a first shrink ring to a first part consists conventionally in axially aligning the first shrink ring, heated to high temperature, and a corresponding cylindrical portion of the first part and in then axially displacing the first shrink ring with respect to the first part in order to shrink fit the first shrink ring to the first part.

The axial alignment of the first part and of the first shrink ring has to be sufficiently precise and the first part and the first shrink ring have to be given dimensions with the smallest possible tolerance.

The physical proximity of the first shrink ring and of the first part during the fitting can result in the appearance of thermal shocks. In particular, the low clearance can result in rapid heat transfers, in particular in the case of contact between the first shrink ring and the first part, and especially when the first part exhibits a high thermal conductivity, for example because it is made of silicon carbide.

These heat transfers can damage the first part. Furthermore, they can result in an expansion of the first part and in a contraction of the first shrink ring resulting in the first shrink ring being locked in position before it has been able to reach the desired definitive position.

There thus exists a need for a shrink fitting process which makes it possible to at least partially solve this problem.

One aim of the invention is to meet, at least partially, this need.

According to a second aspect of the invention, this aim is achieved by coating the first part and/or the first shrink ring with a coating made of a material exhibiting a lower thermal conductivity than that of the material of the first part.

This coating thus limits the heat exchanges between the first part and the first shrink ring and thus reduces the risk of thermal shock and of locking in an intermediate position, in particular in the event of contact during the fitting.

Preferably, the coating material exhibits a thermal conductivity of less than 10 W.m.° C. and, preferably, the ratio of the thermal conductivity of the material of the first part to the thermal conductivity of the coating material is greater than 10.

The coating material is preferably a refractory material. In particular, the coating material can be chosen from zirconia, doped zirconia, cordierite, alumina, mullite, aluminum titanate, yttrium oxide, magnesium oxide, hafnium oxide or a mixture of these materials. A coating comprising more than 80% by weight of zirconia has proved to be particularly effective.

The coating material might also be made of metal.

The first part and/or the first shrink ring may or may not be a first part and/or a first shrink ring of a device according to one or more other aspects of the invention.

Third, Fourth and Fifth Aspects of the Invention

The inventors have found that, when a first shrink ring is fitted to the first part, material can migrate from the first shrink ring toward the first part. In particular, they have found that nickel from the first shrink ring can migrate toward the silicon carbide of the first part, resulting in regions of stresses in the first part, which can result in breakages during temperature changes.

There thus exists a need for a device comprising a first shrink ring fitted to a first part and exhibiting an improved mechanical strength.

Furthermore, when the first part is made of a material based on a silicon compound (that is to say, comprises more than 50% by weight of said silicon compound), in particular when the first part is made of silicon carbide, it may be difficult to make a coating made of a ceramic oxide adhere to the surface of the first part.

This adhesion is particularly problematic when the material of the first part exhibits a total porosity of less than 5%.

There thus exists a need for a process for coating a substrate based on a silicon compound by means of a coating comprising at least one ceramic oxide, this process making it possible to attach said coating in a reliable and lasting fashion.

An objective of the invention is to provide a technical solution for solving, at least partially, the abovementioned problems.

According to a third aspect of the invention, this aim is achieved by means of a process for coating a substrate based on a silicon compound by means of a coating comprising at least one ceramic oxide, said process comprising the following successive stages:

a1) application to said substrate, preferably at ambient temperature, of particles comprising, preferably composed of, said at least one ceramic oxide;

b1) heat treatment of said substrate under conditions suitable for causing said at least one ceramic oxide to react with silicon of the substrate so as to form a coating made of said at least one ceramic oxide and a transition layer comprising silica at the transition between said substrate and said coating;

c1) optionally, application of a layer of a compliant material at the external surface of said coating, said compliant material being in accordance with the eleventh aspect of the invention described below;

d1) optionally, fitting a first shrink ring so that said first shrink ring covers, at least partially, preferably completely, said coating.

Alternatively, according to a fourth aspect of the invention, this aim is achieved by means of a process for coating a substrate based on a silicon compound by means of a coating comprising at least one ceramic oxide, said process comprising the following successive stages:

a2) oxidation, at least at the surface of said substrate, of said silicon compound, for example by a heat treatment under an oxidizing atmosphere, so as to form silica on said surface, b2) application to said substrate, preferably at ambient temperature, of particles comprising, preferably composed of, said at least one ceramic oxide;

c2) heat treatment of said substrate under conditions suitable for causing said at least one ceramic oxide to react with said silica so as to form a coating made of said at least one ceramic oxide and a transition layer comprising silica at the transition between said substrate and said coating;

d2) optionally, application of a layer of a compliant material at the external surface of said coating, said compliant material being in accordance with the eleventh aspect of the invention described below;

e2) optionally, fitting a first shrink ring so that said first shrink ring covers, at least partially, preferably completely, said coating.

Alternatively again, according to a fifth aspect of the invention, this aim is achieved by means of a process for coating a substrate, in particular based on a silicon compound, for example based on SiC, on silicon nitride $Si_3N_4$ or on SiAlON, by means of a coating comprising at least one ceramic oxide, said process comprising the following successive stages:

a3) deposition of a layer of silicon at the surface of the substrate, preferably by plasma spraying;

b3) application to said silicon layer, preferably at ambient temperature, of particles comprising, preferably composed of, said at least one ceramic oxide;

c3) optionally, heat treatment of said substrate in order to cause said at least one ceramic oxide to react with silicon of the substrate so as to form a coating made of said at least one ceramic oxide and a transition layer comprising silica at the transition between said substrate and said coating;

d3) optionally, application of a layer of a compliant material at the external surface of said coating, said compliant material being in accordance with the eleventh aspect of the invention described below;

e3) optionally, fitting a first shrink ring so that said first shrink ring covers, at least partially, preferably completely, said coating.

Stage c3) can be carried out like stage b1). However, in this process, advantageously, no heat treatment is necessary if, in stage b3), the application of the particles is carried out by thermal spraying. The process is advantageously simplified thereby.

Whatever the process according to the invention for coating a substrate based on a silicon compound, the natures of the coating and of the silicon compound of the substrate are not limiting. In particular, the coating and/or the substrate can comprise one or more characteristics of the coating and of the substrate which are defined in the sixth aspect of the invention.

The above processes may also exhibit one or more of the following optional characteristics:

The silicon compound is a nonoxide compound. This is because the processes are particularly well suited to silicon compounds of this type.

In stage a1) or b2), the particles of said at least one ceramic oxide are applied by spraying, painting or dipping. To this end, a slip is prepared and is applied to the substrate. Preferably, the slip does not comprise silica and preferably does not comprise a silicon compound.

In stage b1) or c2) or c3), the substrate is subjected to a firing at a temperature of between 1000° C. and 1400° C., preferably for a period of time of greater than 1 hour.

Stage b1) or c2) or c3) is carried out in situ, that is to say after the coated substrate has been installed in its operating position. Advantageously, the process is simplified thereby and is reduced in cost thereby. For example, when the substrate is a first part of a connecting device according to the invention, this stage can be carried out after definitive attachment of said device, for example after interposition between two tubes positioned within an ethylene production furnace or within a heat exchanger. The firing thus results from the first use of the connecting device.

The invention also relates to a part comprising a coated substrate according to a process according to any one of the third, fourth and fifth aspects of the invention.

Sixth Aspect of the Invention

According to a sixth aspect, the invention also relates to a "coated part" comprising a substrate made of a material based on a silicon compound and a coating made of a coating material comprising at least one ceramic oxide, a transition layer comprising silica extending between the substrate and the coating.

This coated part may exhibit one or more of the following optional characteristics:

The transition layer exhibits a thickness of greater than 0.1 μm and/or of less than 20 μm.

The thickness of the transition layer is less than 10 μm, preferably less than 8 μm and preferably less than 6 μm.

The transition layer is composed of a silica layer continuously adherent to the substrate.

The thickness of the coating is less than 300 μm, preferably less than 250 μm.

The thickness of the coating, which is preferably substantially constant, is greater than 10 μm, preferably greater than 30 μm.

The coating material exhibits a lower thermal conductivity and/or a lower emissivity and/or a greater effusivity than that of the substrate.

The ratio of the thermal conductivity of the material of the substrate to the thermal conductivity of the coating material is greater than 10 and/or less than 150.

The coating material exhibits a lower thermal conductivity than 10 W.m.° C.; preferably, it is a refractory material.

The silicon compound is a nonoxide compound.

The coating material comprises more than 50%, preferably more than 80%, preferably more than 90%, more preferably substantially 100% of said at least one ceramic oxide, as percentage by weight.

The coating material is chosen from the group formed by zirconia, which is optionally doped, in particular with magnesia or with yttrium oxide; cordierite; alumina; mullite; alumina/magnesia spinel; aluminum titanate; yttrium oxide; magnesium oxide; hafnium oxide and the mixtures of these materials. Advantageously, the coated part then exhibits good properties of resistance to adhesion and to scratches, withstands corrosion well and exhibits a low exudation with temperature.

The coating material comprises more than 80% of zirconia. The coating material can in particular be zirconia or a doped zirconia. Preferably, the coating material comprises less than 5% of, less than 1% of, less than 0.1% of, and even no, silicon metal alloy compound and in particular silica.

The coating is covered, at least partially, preferably completely, with a layer made of a compliant material according to the eleventh aspect of the invention and/or with a first shrink ring, in particular as described according to the first aspect of the invention. Advantageously, the coating acts efficiently as a barrier against diffusion, improving the resistance to thermal shocks.

Preferably, the coating is covered, at least partially, preferably completely, with a layer made of a compliant material according to the eleventh aspect of the invention, itself covered with a first shrink ring, in particular as described according to the first aspect of the invention.

The substrate comprises a ceramic material.

The amount by weight of silicon carbide in the substrate is greater than 80%, preferably greater than 90%. Preferably, said material of the substrate is composed of silicon carbide.

The substrate exhibits a total porosity of less than 5%, of less than 2%, indeed even of less than 1%.

The coated part is a part intended to act as firing support, in particular for the firing of ceramic parts. In particular, the coating can be applied to a flat surface of a firing support.

The coated part is manufactured according to a process in accordance with any one of the third, fourth and fifth aspects of the invention.

The substrate and said at least one ceramic oxide are chosen so as to manufacture a "first part" of a device according to one or more other aspects of the invention. A coated part according to the sixth aspect of the invention can thus also comprise one or more of the characteristics, possibly optional, of a "first part" of a device according to one or more other aspects of the invention.

The invention also relates to a coated part according to the invention in the form of a firing support or of a shrink fitted part or of a shrink ring.

As explained above, this is because the coating can be used in particular to coat a first part in order to prevent excessively rapid transfers of heat with a first shrink ring during the fitting of the latter.

The inventors have also discovered that, when a first shrink ring is fitted to a coated part according to the invention, the coating very efficiently limits chemical reactions between the materials of the first part and of the first shrink ring. The coating thus acts as a barrier which limits the diffusion of material between the first part and the first shrink ring. The result of this is an improved resistance in thermal cycling.

In particular in order to limit these heat transfers and/or these chemical reactions, but without being limited thereto, the following optional characteristics are preferred:

- The first shrink ring is itself shrink fitted by means of a second shrink ring.
- The coating at least partially covers a cylindrical surface, in particular with a circular transverse cross section, of the first part and/or of the first shrink ring and/or, if appropriate, of the second shrink ring.
- The coating encircles said cylindrical surface.
- The coating defines at least a portion, preferably all, of the region of contact between said first shrink ring and said first part and/or, if appropriate, between said second shrink ring and said first shrink ring.
- The coating is positioned at least over at least 50%, preferably at least 80%, more preferably substantially 100%, of said region of contact.
- Preferably, the coating extends from the edge of the first part or of the first shrink ring by which the first part penetrates into the first shrink ring during the fitting.
- A second part is attached to the first shrink ring.

The first part and/or the second part and/or the first shrink ring and/or the second shrink ring may or may not be a first part and/or a second part and/or a first shrink ring and/or a second shrink ring of a device according to one or more other aspects of the invention, respectively. A device according to the sixth aspect of the invention can thus also comprise one or more of the characteristics, possibly optional, of a device according to one or more other aspects of the invention.

Generally, the invention relates to an assembly comprising a coated part as described above and a shrink ring fitted to said coated part, said coated part comprising a substrate made of a material based on a silicon compound and a coating made of a coating material comprising at least one ceramic oxide, a transition layer comprising silica extending between the substrate and the coating, said coating defining at least a portion of the region of contact between said shrink ring and said coated part.

The invention also relates to the application of a coating as defined above between a first part and a first shrink ring fitted to the first part as "antidiffusion barrier", that is to say in order to limit the migration of material between said first part and said first shrink ring.

Seventh Aspect of the Invention

Thus, according to a seventh aspect, the invention also relates to a process for shrink fitting a first part, in particular made of a ceramic material, by means of a first shrink ring, in which process, before fitting the first shrink ring to the first part, a coating made of a material exhibiting a lower thermal conductivity and/or a greater effusivity than that of the first part is applied to the first part and/or to the first shrink ring.

The coating is preferably applied to the first part when the first shrink ring is heated in order to allow the fitting.

The coating is preferably applied according to a process for coating a substrate in accordance with the invention.

Preferably, this process is adjusted in order for the first part to be a coated part in accordance with the invention.

Eighth Aspect of the Invention

During their tests, the inventors also found that the joining of a ceramic tube to a metal tube by means of one or more shrink rings, as described according to the first aspect of the invention, can result in breakages in the ceramic tube.

There thus exists a need for a solution which makes it possible to limit damage to a part made of ceramic material when it is shrink fitted by means of a first shrink ring.

An objective of the invention is to meet this need.

According to an eighth aspect of the invention, this objective is achieved by means of a device comprising a first part made of ceramic material shrink fitted by means of a first shrink ring, in which device the edges of the axial ends of the cylindrical portion of said first part and of the first shrink ring by which the first shrink ring has been fitted to the first part belong to one and the same transverse plane.

In other words, the first shrink ring extends up to the edge of the cylindrical portion of said first part to which it has been fitted but without projecting axially therefrom. For the sake of clarity, it is said that the first shrink ring is fitted "flush" to the first part.

In the case of an end-to-end joining of two tubes or of two bars, this type of fitting is novel, the search to firmly attach the tubes or bars to one another naturally prompting at least the first shrink ring to be fitted in overlapping fashion to these two tubes or bars. However, the inventors have found that a "flush" fitting very significantly limits the damage to the first part during the fitting of the first shrink ring.

It is said that two edges "belong to one and the same transverse plane" when their axial offsetting is less than 1 mm. Preferably, according to the invention, this offsetting is less than 0.8 mm, preferably less than 0.5 mm, more preferably less than 0.3 mm, still preferably less than 0.1 mm. In the case where one or both of said edges is/are not included in a transverse plane, it is considered that the two edges "belong to one and the same transverse plane" when, whatever the point of an edge under consideration, the distance from the other edge is less than 1 mm, preferably less than 0.8 mm, preferably less than 0.5 mm, more preferably less than 0.3 mm, still preferably less than 0.1 mm.

The term "transverse plane" describes a plane perpendicular to the axis of the first shrink ring.

A device according to the eighth aspect of the invention can optionally also comprise one or more of the following characteristics:
- A second part is attached, preferably welded or brazed, to the first shrink ring.
- The first shrink ring is itself, preferably, shrink fitted by means of a second shrink ring.
- The second shrink ring is fitted flush to the first shrink ring. In other words, the edges of the axial ends of the first shrink ring, of the second shrink ring and of the first part belong to one and the same transverse plane.
- A second part is attached to the first shrink ring, preferably so as to define, in interaction with the first shrink ring, a chamber, preferably a leaktight chamber, in which the second shrink ring is housed.

The first part and/or the second part and/or the first shrink ring and/or the second shrink ring may or may not be a first part and/or a second part and/or a first shrink ring and/or a second shrink ring of a device according to one or more other aspects of the invention, respectively. A device according to the eighth aspect of the invention may thus also comprise one or more of the characteristics, possibly optional, of a device according to one or more other aspects of the invention.

Ninth Aspect of the Invention

In one embodiment of a device according to the first aspect of the invention, the second part is attached to the first shrink ring by welding or brazing. This is because this type of connection is advantageously mechanically resistant and lasting. However, the inventors have found that, when the first part is made of ceramic material, it may break during the attaching of the second part.

There thus exists a need for a solution which makes it possible to limit this risk of breakage.

An objective of the invention is to meet this need.

According to a ninth aspect of the invention, this objective is achieved by means of a device comprising a first part made of ceramic material shrink fitted by means of a first shrink ring and a second part attached to said first shrink ring, for example by a heating process, the region of junction between the first shrink ring and the second part being at any point separated by at least 1 mm from said first part. For example, in the embodiment of FIG. 3, this separation of at least 0.8 mm, indeed even of at least 1 mm, corresponds to the radial separation δ between the external surface of the ceramic tube and the weld bead which makes it possible to bond the metal tube to the first shrink ring.

As will be seen in more detail in the continuation of the description, the separation of the region of junction limits the interactions with the first part during the attaching of the second part to the first shrink ring. In particular, when the second part is welded or brazed to the first shrink ring, this separation reduces the heat gradients within the first part.

A device according to the ninth aspect of the invention may optionally also comprise one or more of the following characteristics:
- The region of junction extends at right angles with the first part. In particular, when the first part is a tube, said separation is a radial separation, measured along a straight line included in a transverse plane and passing through the axis of the tube.
- Said separation, in particular when it is radial, is greater than 0.8 mm, greater than 1 mm, preferably greater than 3 mm, greater than 5 mm, more preferably greater than 10 mm, or even greater than 15 mm.
- The second part is welded or brazed to the first shrink ring.
- The first shrink ring exhibits a flange, continuous or non-continuous, preferably continuous, to the edge of which the second part is attached.
- The flange is continuous and encircles said first shrink ring.
- The flange is provided at an axial end of said first shrink ring.
- The flange is positioned at the axial end of the first shrink ring by which the first shrink ring has been fitted (that is to say, introduced axially) to the first part.
- The first shrink ring is itself shrink fitted by means of a second shrink ring.

In a particularly advantageous embodiment, the first shrink ring is not fitted flush to the first part but projects axially therefrom and the second part is attached to the projecting portion of the first shrink ring, preferably at the end of the first shrink ring opposite the end by which it has been slipped onto the first part.

Advantageously, this embodiment does not require the provision of a flange, which simplifies the manufacture of the first shrink ring. In addition, it allows a minimal space requirement.

Preferably, the optional second shrink ring is, however, fitted flush to the first part, that is to say that it extends up to the edge of the cylindrical part of said first part to which it has been fitted.

The first part and/or the second part and/or the first shrink ring and/or the second shrink ring may or may not be a first part and/or a second part and/or a first shrink ring and/or a second shrink ring, respectively, of a device according to one or more other aspects of the invention. A device according to the ninth aspect of the invention may thus also comprise one or more of the characteristics, possibly optional, of a device according to one or more other aspects of the invention.

Tenth Aspect of the Invention

The inventors have also sought to increase the lifetime of a device according to the first aspect of the invention.

According to a tenth aspect of the invention, they have thus discovered a device comprising a first part made of a ceramic material shrink fitted by means of a first shrink ring, in which at least a portion of the first shrink ring, preferably at least the portion of the first shrink ring in contact with the first part, indeed even all of the first shrink ring, is protected by covering by means of a shield.

Preferably, the first shrink ring is itself shrink fitted by means of a second shrink ring and at least a portion of the second shrink ring, preferably at least the portion of the second shrink ring in contact with the first shrink ring, indeed even all of the second shrink ring, is protected by covering by means of a shield.

As will be seen in more detail in the continuation of the description, the installation of a protective shield at least partially covering a shrink ring makes it possible to limit the damage thereto, in particular by mechanical attacks, and thus to increase the lifetime of the device.

A device according to the tenth aspect of the invention can optionally also comprise one or more of the following characteristics:
- The shield encircles the first shrink ring and/or the second shrink ring.
- The shield is not in contact with the portion of the first shrink ring in contact with the first part.
- The shield is not in contact with the second shrink ring.
- The shield, preferably in interaction with the first shrink ring, delimits a chamber, preferably an annular chamber.
- The second shrink ring is housed in said chamber.

The chamber is airtight.

The chamber can exhibit any cross section. It can extend over all or a portion of the periphery of the portion of the first part to which the first shrink ring is attached.

The chamber contains a cooling or refrigerating or heat-exchange or thermally insulating or chemically insulating fluid and/or measurement means, in particular means for measuring the pressure and/or the temperature, and/or detection means and/or means for analyzing the environment.

A second part is attached, preferably welded, to the first shrink ring, preferably via said shield.

The shield forms a portion of the second part and is preferably integral with the second part.

The shield, indeed even the second part, is attached, preferably welded, to a flange of the first shrink ring, preferably to the free edge of said flange, said flange preferably being integral with the first shrink ring.

The flange is positioned at the end of the first shrink ring by which the first shrink ring has been fitted to the first part. If appropriate, the flange is preferably positioned on the side of the first shrink ring opposite, with respect to the second shrink ring, the axial end of the cylindrical portion of the first part by which the first shrink ring has been fitted to the first part.

The second shrink ring is positioned axially between the flange and the edge of the axial end of the first part by which the first shrink ring has been fitted to the first part.

The amount by weight of silicon carbide in the material of the first part is greater than 80%.

The first part and/or the second part and/or the first shrink ring and/or the second shrink ring may or may not be a first part and/or a second part and/or a first shrink ring and/or a second shrink ring, respectively, of a device according to one or more other aspects of the invention. A device according to the tenth aspect of the invention may thus also comprise one or more of the characteristics, possibly optional, of a device according to one or more other aspects of the invention.

Eleventh Aspect of the Invention

During cleaning operations, the pressure inside the tubes of an ethylene production unit can be considerably increased and can typically reach several bar. During the thermal cycling, the leaktightness of the connection by the shrink rings may also be challenged by the pressure of the reactive mixture, typically greater than 2.5 bar, at temperatures of greater than 900° C., indeed even of greater than 1000° C.

The inventors have thus looked for additional solutions in order to improve the leaktightness of the connection between two parts subjected to such stresses and in particular between two parts exhibiting very different thermal expansion coefficients.

According to an eleventh aspect of the invention, they have thus discovered a device comprising a first member joined to a second member preferably exhibiting a greater thermal expansion coefficient than the first member, the joining being carried out via a compliant material composed of an alloy comprising at least two materials from silver, gold and palladium. The inventors have found that said compliant material withstands very well an environment subjected to high variations in temperature while providing good cohesion of the joined members and leaktightness of the connection.

A device according to the eleventh aspect of the invention can optionally also comprise one or more of the following characteristics:

The alloy comprises, indeed even is composed of:
silver and/or gold and
palladium.

The alloy comprises more than 0.5% of palladium, indeed even more than 3% of palladium, as percentage by weight.

The alloy comprises less than 50% of palladium, as percentage by weight.

The alloy comprises less than 30% of palladium, as percentage by weight.

The alloy comprises less than 5% of glass frit.

The thickness of compliant material between the two members is less than 1 mm and/or greater than 5 µm, preferably greater than 10 µm.

The second member is a shrink ring of the first member.

The second member is itself shrink fitted by means of a third member.

The material of the third member exhibits a content by weight of niobium and/or of Dilver P1 of greater than 80%.

The joining of the third member to the second member is carried out via a layer made of said compliant material.

The material of the second member exhibits a greater thermal expansion coefficient than the material of the first member and, if appropriate, the third member exhibits a lower thermal expansion coefficient than the thermal expansion coefficient of the second member, between 20° C. and 1000° C.

The amount by weight of silicon carbide in the material of the first member is greater than 80%.

A fourth member is attached to the second member.

The first member is coated with a coating made of a refractory material.

The refractory material is preferably chosen from zirconia, a doped zirconia, cordierite, alumina, mullite, aluminum titanate, yttrium oxide, magnesium oxide, hafnium oxide or a ,mixture of these materials.

The first member is coated with a coating made of a material exhibiting a lower thermal conductivity than that of the material of the first member.

The coating is in accordance with that described according to the second aspect of the invention.

The invention also relates to a process for joining a first member and a second member via a compliant material interposed between a first surface of the first member and a second surface of the second member, in which process:
a) at least one of the first and second surfaces is coated by means of a precursor of a compliant material as defined above;
b) the first surface is pressed against the second surface with a pressure of greater than 5 MPa, and
c) preferably simultaneously with stage b), said first and second surfaces in contact are heated to a temperature of greater than 150° C.

Preferably, in stage a), both the first surface and the second surface are coated with the compliant material precursor. Preferably again, in stage b), the pressure is exerted by shrink fitting the first member by means of the second member.

The compliant material precursor can in particular be a suspension of powders formed of silver and/or of gold and of palladium.

The first member and the second member can in particular be a first part and a first shrink ring, respectively, or a first shrink ring and a second shrink ring, respectively, of a device according to one or more other aspects of the invention. In the presence of a first part and of two shrink rings, the compliant material precursor can in particular be positioned so that the compliant material extends between the first part and the first shrink ring and between the first shrink ring and the second shrink ring. The third member can also be a second shrink ring. A device according to the eleventh aspect of the invention can also comprise one or more of the characteristics, possibly optional, of a device according to one or more other aspects of the invention.

The invention also relates to an item of equipment chosen from a furnace, a boiler, a superheater, a steam generator, a chemical reactor and a heat exchanger, intended in particular for the production of ethylene, said item of equipment comprising a device according to any one of the aspects of the invention. In particular, said item of equipment can comprise at least one tube made of a material based on a silicon compound, in particular made of silicon carbide, attached by at least one of its ends to a metal tube, the tube made of a material based on a silicon compound and the metal tube respectively constituting a first part and a second part of a device according to any one of the aspects of the invention and/or the tube made of a material based on a silicon compound constituting a coated part according to the sixth aspect of the invention and/or the tube made of a material based on a silicon compound or a first shrink ring fitted to the tube made of a material based on a silicon compound constituting a first member of a device according to the eleventh aspect of the invention and/or the tube made of a material based on a silicon compound, the first shrink ring fitted to the tube made of a material based on a silicon compound, the second shrink ring fitted to the first shrink ring and the metal tube constituting a first member, a second member, a third member and a fourth member, respectively, of a device according to the eleventh aspect of the invention.

Twelfth Aspect of the Invention

The inventors have also sought to improve the quality of the connection of a ceramic tube with a metal tube of a connecting device according to the invention, in particular in an environment such as that of an ethylene production furnace. They have thus discovered particularly advantageous adjustments.

If:

ED denotes the external diameter of the assembly formed by the ceramic tube, optionally the coating made of a material exhibiting a lower thermal conductivity than that of the material of the ceramic tube (according to the second aspect of the invention) and optionally the layer made of compliant material between the ceramic tube and the first shrink ring (according to the eleventh aspect of the invention), $ED_{42}$ denotes the external diameter of the first shrink ring, $ID_{42}$ denotes the internal diameter of the first shrink ring, $ID_{42}$ denotes the internal diameter of the second shrink ring, $\Delta_1$ denotes the ratio $100*(ED-ID_{42})/ED$, and $\Delta_2$ denotes the ratio $100*(ED_{42}-ID_{44})/ED_{42}$, all the measurements being carried out at 20° C., $\Delta_1$ and/or $\Delta_2$, preferably $\Delta_1$ and $\Delta_2$, are greater than or equal to 0.00 and/or less than 0.25, indeed even less than or equal to 0.20.

Preferably, $\Delta_1$ is greater than or equal to 0.05.

BRIEF DESCRIPTION OF THE FIGURES

Other characteristics and advantages of the invention will become more apparent on reading the detailed description which will follow and from the appended drawing, in which.

In the various figures, identical references are used to denote identical or analogous members.

DETAILED DESCRIPTION

FIG. 1 was described in the preamble of the description.

Shrink fitting is a technique for the axial fitting of an external part to an internal part which makes use of the difference in dilatometric behavior between these two parts. The external part is conventionally referred to as "shrink ring". The internal part is referred to as "shrink fitted".

Figure 2:
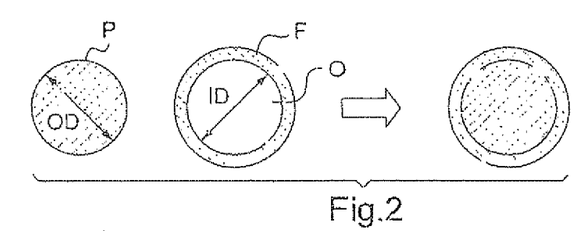
FIG. 2 represents, in transverse cross section, a shrink ring and a shrink fitted part, before and after joining.

More specifically, the shrink ring is made of a material exhibiting a greater thermal expansion coefficient than that of the internal part. As represented in FIG. 2, the shrink ring F exhibits an orifice O, delimited by an internal surface, the dimensions of which make it difficult, indeed even impossible, to fit it to the internal part P by hand or even, conventionally, using a press. When the shrink ring F is cylindrical with a circular transverse cross section, its internal diameter ID is thus less than the external diameter OD of the internal part P in the range of temperatures anticipated for the use of the joined components. In this range, the fitting of the shrink ring is thus impossible. For this, the shrink ring F has to be brought to a temperature greater than that of the internal part P. This difference in temperatures can be obtained by heating the shrink ring F and/or by cooling the internal part P, for example with liquid nitrogen or with dry ice. The difference in temperatures has to be determined in order for the dimensions of the orifice O of the shrink ring F to then allow it to be introduced over the internal part.

Once the shrink ring F has been introduced over the internal part P, the combination is brought to the same temperature, for example to the starting ambient temperature, which results in the shrink ring F compressing the internal part and provides the cohesion between the shrink ring F and the internal part P. However, this cohesion may be challenged if the temperature of the surroundings of the joined components increases. This is because the shrink ring will then expand more rapidly than the internal part. An increase in the temperature may thus result in a loss of leaktightness, indeed even in an unintentional separation of the parts.

In particular, under the conditions of variation temperature of a furnace of an ethylene production unit, the inventors have found that joining a metal tube by shrink fitting to a ceramic tube is unsatisfactory. This is because the thermal expansion coefficients of the materials of these tubes are too different for the shrink fitting to be able to provide a reliable connection over a range of temperatures with an amplitude of more than 1000° C.

U.S. Pat. No. 4,624,484 describes a connecting device which makes it possible to join a ceramic part by means of a shrink ring. Before fitting the shrink ring, a layer made of a nonferrous metal is applied to the internal surface of the shrink ring intended to be brought into contact with the ceramic part. After fitting, this layer deforms so as to compensate for the differences in expansion between the ceramic tube and the shrink ring. Such a layer, or generally a coating, are not shrink rings.

The inventors then imagined providing the connection between the ceramic tube and the metal tube by means of several intermediate shrink rings exhibiting gradually increasing thermal expansion coefficients: a first shrink ring exhibiting a slightly greater thermal expansion coefficient than that of the ceramic tube was fitted to this ceramic tube, a second shrink ring exhibiting a slightly greater thermal expansion coefficient than that of the first shrink ring was fitted to this first shrink ring, this type of fitting being reproduced until a shrink ring is obtained exhibiting a thermal expansion coefficient similar to that of the metal tube. The metal tube was subsequently attached to this final shrink ring. However, tests have shown that, under the conditions of variation in temperature of a furnace of an ethylene production unit, this technical solution results in the application of high stresses to the ceramic tube and can result in the breaking thereof.

The inventors then devised and produced a connecting device of an entirely different design.

In one embodiment, this connecting device comprises a first shrink ring fitted to the ceramic tube and a second shrink ring fitted to the first shrink ring, the second shrink ring exhibiting a lower thermal expansion coefficient than that of the first shrink ring. In the event of an increase in the temperature, the second shrink ring thus opposes the expansion of the first shrink ring and thus prevents a loss in leaktightness or a separation from the first shrink ring. In addition, this type of joining has proved to be particularly reliable under the conditions of an ethylene production furnace.

Figure 3:
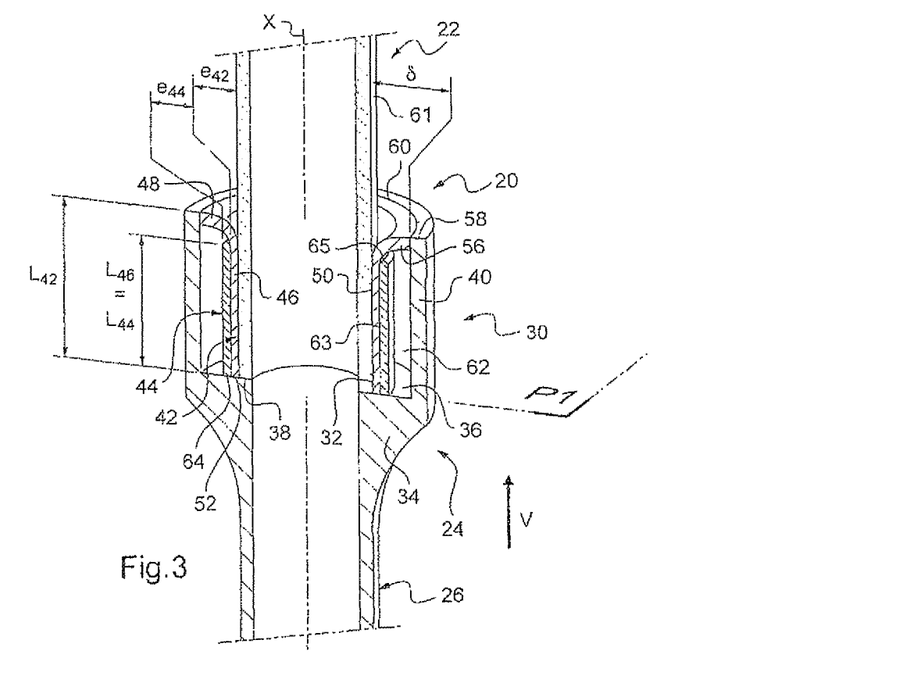
FIG. 3 represents, in perspective and cut by a median longitudinal plane, a device according to a preferred embodiment of the invention.

FIG. 3 represents an example of joining by means of a connecting device according to a preferred nonlimiting embodiment of the invention.

For the sake of clarity, the tubes represented in FIG. 3 are regarded as positioned along a vertical axis V. Without implied limitation, the words "top", "bottom", "upper" and "lower" are used to describe members or member portions as a function of their position with respect to this axis.

FIG. 3 represents the lower portion 20 of a ceramic tube 22 with an axis X connected coaxially to the upper portion 24 of a metal tube 26 by means of a connecting device 30.

The ceramic tube 22 and the metal tube 26 exhibit, except at the connecting device, identical annular transverse cross sections. The external diameter of the tubes 22 and 26 is preferably greater than 50 mm and/or less than 100 mm. The internal diameter of the tubes 22 and 26 is preferably greater than 40 mm and/or less than 50 mm.

The ceramic tube 22 is made of a nonoxide material, preferably of silicon carbide, and preferably exhibits a porosity of less than 1%, this porosity being closed.

The lower portion 20 of the ceramic tube 22 is coated with a thermally insulating coating 32, for example made of zirconia. The coating 32 extends along an annular surface intended to act as support for a first shrink ring which will be described below. It exhibits a thickness of approximately 30 µm.

Photographs show, at the interface between the silicon carbide of the ceramic tube 22 and the zirconia of the coating 32, the presence of a transition layer with a substantially constant thickness of approximately 5 µm. The transition layer is composed of a silica layer continuously adherent to the ceramic tube 32.

Except in its upper portion 24, the metal tube 26 is a tube similar to the tubes used in the prior art upstream or downstream of the furnaces used for the production of ethylene.

The upper portion 24 of the metal tube 26 comprises a wall 34, the thickness of which gradually broadens until a maximum is reached in a transverse plane $P_1$. In this plane, the metal tube 26 exhibits a flat annular surface 36, on which will rest a lower edge 38 of the ceramic tube 22 and/or the lower edge of the first shrink ring described above, in the nonlimiting embodiment of FIG. 3. A cylindrical peripheral skirt 40 with a circular cross section with an axis X extends upward from the periphery of the annular surface 36.

The connecting device 30 comprises a first shrink ring 42 and a second shrink ring 44.

The first shrink ring 42 is composed of a material exhibiting a thermal expansion coefficient of less than $25.10^{-6}$ $K^{-1}$ and greater than $10.10^{-6}$ $K^{-1}$ between 20 and 1000° C. and is preferably composed of the same material as the metal tube 26, for example of HP40 steel or of an FeNiCr alloy. The use of the same material to manufacture the metal tube 26 and the first shrink ring 42 advantageously facilitates the welding thereof to one another.

The first shrink ring 42 exhibits a total length $L_{42}$ of approximately 60 mm and a substantially constant wall thickness $e_{42}$ preferably between 1 and 5 mm, preferably of approximately 2 mm. The actions of the second shrink ring on the first shrink ring and of the first shrink ring on the ceramic tube 22 are then optimal in the event of an increase in the temperature from 20° C. to 900° C.

In one embodiment, the first shrink ring 42 exhibits a substantially constant wall thickness $e_{42}$ of greater than 3 mm, indeed even greater than 3.5 mm, indeed even substantially equal to 4 mm. This is because the inventors have discovered that the thickness of the first shrink ring modifies the quality of the leaktightness of the connection at ambient temperature, the best results having been obtained with a thickness $e_{42}$ of approximately 4 mm.

The first shrink ring 42 exhibits the shape of a cylindrical sleeve 46 of circular cross section and with a length $L_{46}$ of approximately 50 mm, which is extended upward by a flange 48.

Over its entire length, the cylindrical sleeve 46 is in contact with the coating 32 of the ceramic tube 22 via a layer 50 of a compliant material which improves the leaktightness between the ceramic tube and the first shrink ring. The layer 50 exhibits a substantially constant thickness of approximately 30 µm.

The compliant material comprises, on the one hand, silver and/or gold and, on the other hand, palladium. The inventors have discovered that such a material is particularly reliable. In particular, this material exhibits a very good refractoriness and a very high melting point which render it compatible with the stresses encountered in a furnace of an ethylene production unit.

For example, the compliant material comprises approximately 30% of palladium, the remainder being silver.

The cylindrical sleeve 46 defines a lower edge 52 of the first shrink ring 42. The lower edge 52 of the cylindrical sleeve 46 is coplanar with the lower edge 38 of the ceramic tube 22 and may be in contact with the annular surface 36. This is because the inventors have discovered that this configuration limits the risks of breakage of the ceramic tube 22.

The flange 48 results from a gradual opening out until the wall of the first shrink ring extends substantially perpendicular to the axis X. This gradual opening out limits the risks of breakage of the ceramic tube during the fitting of the first shrink ring 42 and facilitates the introduction of the ceramic tube 22 into the first shrink ring 22. The flange 48 defines a circular "upper edge" 56 of the first shrink ring 42.

The upper edge 58 of the peripheral skirt 40 is attached to the upper edge 56 of the flange 48 by means of a weld bead 60. The radial separation δ between the external surface 61 of the ceramic tube 22 and the weld bead 60 is, for example, approximately 5 mm.

The annular surface 36, the peripheral skirt 40 and the first shrink ring 42 thus define a chamber 62. The weld bead 60 is preferably continuous, so that the chamber 62 is substantially leaktight. Optionally, the chamber 62 is also isolated from the internal volume of the ceramic tube 22 and the metal tube 26.

The internal volume of the chamber 62 is a few tens of cm$^3$, preferably of more than 20 cm$^3$, of more than 50 cm$^3$, and/or preferably of less than 100 cm$^3$, of less than 80 cm$^3$, preferably of approximately 70 cm$^3$. Advantageously, the optional accumulation of coke is thus limited.

The second shrink ring 44 is composed of a material exhibiting a lower thermal expansion coefficient than that of the first shrink ring. The difference in the thermal expansion coefficients between the first shrink ring and the second shrink ring is determined as a function of the application. When the connecting device is intended to be subjected to variations in the temperatures such as those encountered inside the chamber of an ethylene production unit furnace or immediately upstream or downstream of such a chamber, the second shrink ring can in particular be made of an alloy comprising more than 70% of niobium and/or of Dilver P1. Such a niobium and/or Dilver P1 alloy advantageously exhibits a low thermal expansion coefficient, a low Young's modulus (modulus of elasticity) and a good resistance to heat and to corrosion at high temperature, it being possible for the latter to be further improved by the presence of a coating. For example, the material of the second shrink ring comprises 89% of niobium, 10% of hafnium and 1% of titanium. The resistance to corrosion can be further improved by coating the second shrink ring with a protective coating, or "coating" of the "coating 32" type. The second shrink ring 44 exhibits the shape of a cylindrical sleeve of circular cross section and is fitted to the first shrink ring by shrink fitting via a layer 63 of compliant material, for example identical to that extending between the ceramic tube and the first shrink ring.

The length $L_{44}$ of the second shrink ring 44 is substantially identical to that of the cylindrical sleeve 46 of the first shrink ring 42. The thickness $e_{44}$ is between 3 and 15 mm, preferably between 5 and 13 mm. The action of the second shrink ring on the first shrink ring is then optimal in the event of an increase in the temperature.

Furthermore, the second shrink ring 44 is housed inside the chamber 62. Advantageously, the second shrink ring 44 is thus protected from the outside world. The peripheral skirt 40 thus acts as protective shield for the second shrink ring 44 but also for the first shrink ring 42.

The lower edge 64 of the second shrink ring 44 is substantially coplanar with the lower edge 38 of the ceramic tube 22 and the lower edge 52 of the first shrink ring 42. This is because this configuration has proved to be optimal in limiting the risk of breakage of the ceramic tube during the fitting of the second shrink ring.

The upper edge 65 of the second shrink ring 26 is beveled toward the inside and toward the outside.

A connecting device such as that represented in FIG. 3 can be produced in the following way:

The lower portion of the ceramic tube 22 is first covered with the insulating coating 32. However, the adhesion of a coating made of ceramic oxide to a tube made of a nonoxide material is difficult, in particular when the nonoxide material is not or only slightly porous.

In particular, conventional techniques for the direct spraying of very fine particles of said ceramic oxide by means of a plasma torch have proved to be ineffective in the case of spraying onto a first part made of nonoxide ceramic.

However, the inventors have discovered several novel processes for coating a substrate based on a silicon compound by means of a coating comprising at least one ceramic oxide. In particular, they have discovered a process for coating a substrate based on a silicon compound by means of a coating comprising at least one ceramic oxide, comprising the following successive stages:
  a1) application to said substrate, preferably at ambient temperature, of particles comprising, preferably composed of, said at least one ceramic oxide;
  b1) heat treatment of said substrate under conditions suitable for causing said at least one ceramic oxide to react with silicon of the substrate, so as to form silica.

Preferably, the particles of said at least one ceramic oxide are applied directly to the substrate, without an intermediate layer. In particular, no intermediate layer of silicon or of silica is positioned on the substrate before stage a1). The thickness of the transition layer formed during stage b1) is then advantageously very low, typically of less than 10 μm, indeed even less than 8 μm or even of less than 6 μm.

In a preferred embodiment, a process according to the invention does not comprise a stage which makes it possible to form silica before stage a1).

In stage a1), all conventional techniques can be used to apply the particles. In particular, the particles of said ceramic oxide can be applied by spraying, painting or dipping. To this end, a slip is prepared and is applied to the substrate. The slip conventionally comprises a solvent, preferably water, an organic dispersant and said particles.

Preferably, the slip does not comprise silica and preferably does not comprise a silicon compound. After firing, the silica will thus be present only in the transition layer, a coating devoid of silica being exposed to the outside world. The absence of silica may modify the permeability of the coating but, in the embodiment represented, this modification has no practical effect, the coating being itself covered with a layer made of compliant material and/or with a first shrink ring. In addition, the manufacturing process is simplified thereby.

Application can be carried out at ambient temperature, for example in the open air. The amount of particles is adjusted according to the coating thickness desired.

Preferably again, the process does not comprise any stage between stages a1) and b1).

In stage b1), the substrate is preferably subjected to firing at a temperature of between 1000° C. and 1400° C., preferably for a time of greater than 1 hour, for example under air.

Surprisingly, the heat treatment results in the formation, in the substrate, of a transition layer in which a portion of the silicon compound has reacted to form a silica layer within the material of the substrate. Without being able to explain it theoretically, the inventors have found that the silica layer considerably improves the quality of the adhesion of the ceramic oxide.

In a preferred embodiment, a process according to the invention comprises only stages a1) and b1). The silica of the transition layer thus results exclusively from the implementation of stage b1). The process is then particularly easy to carry out.

The inventors have also developed alternative forms of this process.

In particular, they have discovered a process for coating a substrate based on a silicon compound by means of a coating comprising at least one ceramic oxide, this process comprising the following successive stages:

- a2) oxidation, at least at the surface of said substrate, of said silicon compound, for example by a heat treatment under an oxidizing atmosphere, so as to form silica;
- b2) application to said substrate, preferably at ambient temperature, of particles comprising, preferably composed of, said at least one ceramic oxide;
- c2) heat treatment of said substrate under conditions suitable for causing said at least one ceramic oxide to react with said silica.

In stage a2), the oxidative heat treatment can, for example, be carried out by heating the surface of the substrate at a temperature of 1250° C. for 3 hours, for example under air, for example at atmospheric pressure.

In one embodiment, only a portion of the substrate, in particular only its surface or only the section of its surface intended to receive the coating, is heated. For example, in the case of a ceramic tube, it is not always necessary to introduce all the tube into the furnace.

Preferably, only a surface layer of the substrate is oxidized. More preferably, the substrate is oxidized only over a depth of less than 20 μm.

In stage b2), the particles of said at least one ceramic oxide can be applied as in stage a1).

In stage c2), the substrate is preferably subjected to firing at a temperature of between 1000° C. and 1400° C., preferably for a time of greater than 1 hour, for example under air.

The inventors have also invented a process for coating a substrate based on a silicon compound by means of a coating comprising at least one ceramic oxide, this process comprising the following successive stages:

- a3) deposition of a silicon layer at the surface of the substrate, preferably by plasma spraying;
- b3) application to said silicon layer, preferably at ambient temperature, of particles comprising, preferably composed of, said at least one ceramic oxide;
- c3) optionally heat treatment of said substrate in order to cause said at least one ceramic oxide to react with silicon of the substrate, so as to form silica.

In stage a3), a conventional plasma torch can be employed.

In stage b3), the particles of said at least one ceramic oxide can be applied as in stage a1).

Stage c3) can be carried out as in stage b1). However, in this process, advantageously no heat treatment is necessary if, in stage b3), the application of the particles is carried out by thermal spraying. The process is advantageously simplified thereby.

It is possible to cause the coating 32 of zirconia to adhere to the substrate formed by the lower portion of the ceramic tube 22 by following one of the three processes which have just been described.

Before installing the first shrink ring 42 on the first part, a layer of compliant material precursor is applied to the external surface of the lower portion 20 of the ceramic tube 22 and/or to the internal surface (intended to come into contact with the lower portion 20 of the first shrink ring 42.

The compliant material precursor can be prepared in the form of a suspension in an organic solvent. This suspension is then applied, for example by spraying, painting or dipping. The solvent is then removed, for example by drying.

The particle size distribution of the powder of the suspension and the amount and the nature of the solvent are adjusted according to the nature of the surfaces and the thickness of compliant material which are desired.

The fitting of the first shrink ring 42 to the lower portion 20 of the ceramic tube 22 is subsequently carried out, preferably by expanding the first shrink ring by heating and by then introducing it axially, by its axial end provided with the flange 48, over the ceramic tube 22.

Preferably, the first shrink ring is fitted "flush" to the lower portion 20 of the ceramic tube 22. In other words, it is immobilized in a position in which its lower edge 52 is aligned, in one and the same transverse plane, with the lower edge 38 of the ceramic tube. The inventors have found that this arrangement advantageously limits the risk of breakage of the ceramic tube.

As explained above, silicon carbide is highly conducting thermally and any contact between the first shrink ring 42 and the ceramic tube 22 would result, in the absence of the coating 32, in the sudden contraction in the first shrink ring, resulting in it becoming locked axially before it could reach the definitive position desired.

The presence of the coating 32 limits the heat exchanges between the first shrink ring 42 and the ceramic tube 22, in particular in the event of contact. This is because, during the introduction of the first shrink ring 42 over the ceramic tube 22, the insulating coating advantageously forms a thermal barrier which limits transfers of heat between the first shrink ring 42 at high temperature and the thermally conducting ceramic tube 22.

The term "clearance" J refers to the difference between the internal diameter of the first shrink ring 42 and the external diameter of the ceramic tube 22. At the time of the introduction of the first shrink ring 42 over the ceramic tube 22, the clearance J is positive and allows the fitting by shrink fitting of the first shrink ring to the ceramic tube 22. By virtue of the presence of the coating, the clearance J can advantageously be considerably reduced and/or the temperature of the first shrink ring decreased, without the risk of untimely axial locking.

Figure 4:
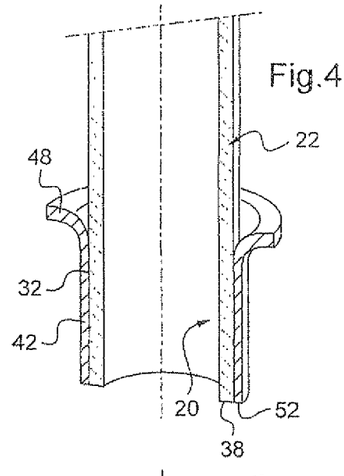
FIGS. 4 to 6 illustrate the various stages of a process used to join together the device represented in FIG. 3.

The return to ambient temperature results in a greater contraction of the first shrink ring than that of the ceramic tube, which leads to a cancellation of the clearance J and then to a pressure of the first shrink ring on the ceramic tube 22 (FIG. 4). Advantageously, this compression also contributes to the effectiveness of the compliant material. Before installing the second shrink ring 44 on the first shrink ring 42, a layer of compliant material precursor is also applied to the external surface of the first shrink ring 42 and/or to the internal surface of the second shrink ring 44, at least over the areas of these surfaces intended to be in contact after shrink fitting.

Figure 5:
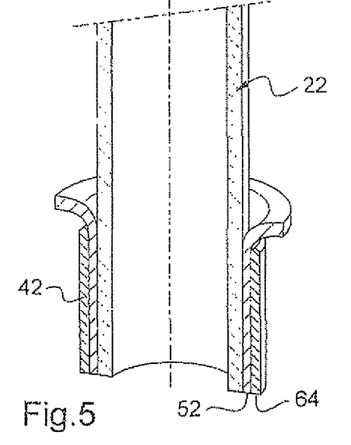

The second shrink ring 44 can then be fitted to the first shrink ring 42 by a conventional shrink fitting (FIG. 5). The shape beveled toward the inside of the upper edge 65 of the second shrink ring 44 facilitates the shrink fitting to the first shrink ring.

As for the fitting of the first shrink ring to the ceramic tube 22, a coating which forms a thermal barrier can also be applied to the external surface of the first shrink ring in order to limit the clearance necessary during the shrink fitting operation. Preferably, the second shrink ring is fitted "flush" to the first shrink ring. In other words, it is immobilized in a position in which its lower edge 64 is aligned, in one and the same transverse plane $P_1$, with the lower edge 52 of the first shrink ring. The inventors have found that this position advantageously limits the risk of breakage of the ceramic tube.

The shape beveled towards the outside of the upper edge 65 of the second shrink ring 44 also advantageously limits the stresses applied to the ceramic tube 22.

The ceramic tube 22 is subsequently brought closer coaxially to the metal tube 26 until it abuts against the annular surface 36. As the first shrink ring 42 and the second shrink ring 44 are fitted flush with the lower edge 38 of the ceramic tube 22, it is also possible for the support on the annular surface 36 to be achieved via the lower edge 52 of the first shrink ring 42 and/or the lower edge 64 of the second shrink ring.

Figure 6:
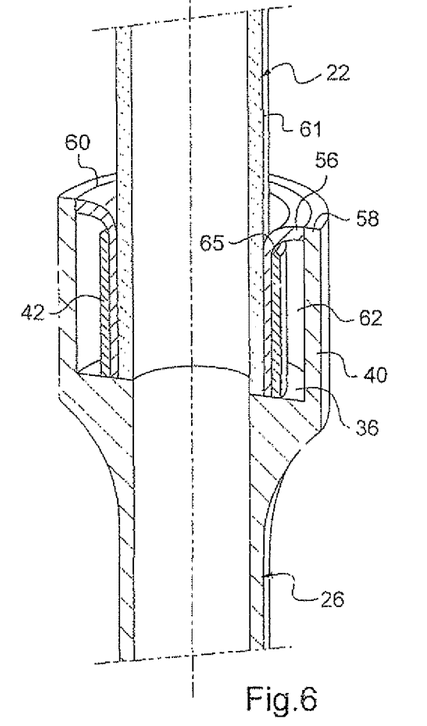

In this abutment position, as represented in FIG. 6, the upper edge 58 of the peripheral skirt 40 faces the upper edge 56 of the flange 48. These edges are then united by welding or brazing.

The production of the weld bead 60 conventionally involves temperatures of approximately 1500° C. Advantageously, the region of junction (weld bead 60) between the upper edge 56 of the flange 48 and the upper edge 58 of the peripheral skirt 40 is at a distance from the external surface 61 of the ceramic tube 22. Advantageously, the risk of a thermal shock capable of breaking the ceramic tube is limited thereby.

In this position, the first shrink ring 42 and the metal tube 26 delimit the chamber 62. The second shrink ring is positioned in the chamber 62. Advantageously, it is thus protected from attacks, in particular physical attacks.

Preferably, the weld bead 60 is substantially continuous, so that the chamber 62 is leaktight, thus also protecting the second shrink ring from chemical attacks.

The ceramic tube 22 is then reliably attached to the metal tube 26.

Figure 7:
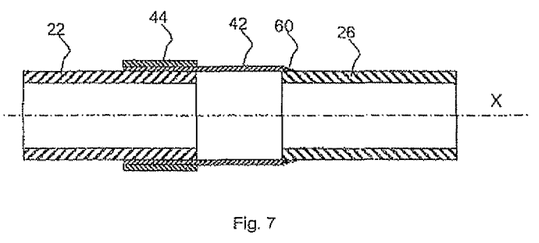
FIG. 7 represents an alternative form of a device according to the invention.

FIG. 7 represents a device according to the invention according to an alternative form in which the first shrink ring 42 has the form of a sleeve which projects beyond the axial end of the ceramic tube 22. The metal tube is attached to the free end of the first shrink ring 42 by means of a weld bead 60, at a distance from the ceramic tube. The second shrink ring 44 is fitted flush to the ceramic tube 22.

Alternative forms of the embodiment represented in FIG. 7 are possible. For example, the metal tube 26 can be welded end-to-end with the first shrink ring 42, the first shrink ring and the metal tube being in contact edgewise. The internal diameter and/or the external diameter of the first shrink ring 42 may be constant or variable along the axis X. The metal tube 26 can also be attached to the external surface of the first shrink ring 42.

Tests have been carried out with a connecting device of the type of that represented in FIG. 3. If:

ED: denotes the external diameter of the assembly formed by the ceramic tube 22, the coating 32 and the layer 50 of compliant material, $ED_{42}$: denotes the external diameter of the first shrink ring 42, $ID_{42}$: denotes the internal diameter of the first shrink ring 42, $ID_{42}$: denotes the internal diameter of the second shrink ring 44, $\Delta_1$: denotes the ratio $100*(ED-ID_{42})/ED$, and $\Delta_2$: denotes the ratio $100*(ED_{42}-ID_{44})/ED_{42}$, all the measurements being carried out at 20° C., the combinations of the following values of $\Delta_1$ and $\Delta_2$ resulted in particularly reliable fittings:

TABLE 1

| Example | $e_{42}$ | $e_{44}$ | $\Delta_1$ | $\Delta_2$ |
|---|---|---|---|---|
| 1 | 2 | 10 | 0.20 | 0.20 |
| 2 | 2 | 12 | 0.10 | 0.20 |
| 3 | 2 | 10 | 0.20 | 0.10 |
| 4 | 2 | 10 | 0.10 | 0.10 |
| 5 | 3 | 10 | 0.10 | 0.15 |
| 6 | 4 | 10 | 0.10 | 0.10 |
| 7 | 4 | 10 | 0.05 | 0.00 |

Tests have also been carried out with the device of example 6, in order to measure the advantage of a coating 32 at the surface of the ceramic tube and of a layer 50 made of compliant material interposed between the coating 32 and the first shrink ring 42.

The compliant material was made of an Ag/Pd alloy. The results obtained are summarized in the following table 2:

TABLE 2

| Example 6 | Results with thermal cycling at 900° C. |
|---|---|
| without coating 32 or layer 50 | Breaking in the second cycle |
| with coating 32 of zirconia and layer 50 | No breaking after 5 cycles and leaktightness retained |
| with coating 32 of alumina/zirconia and layer 50 | |

These results show that the coating 32 and the layer 50 not only have an effect on the leaktightness but also have an effect on the resistance to thermal cycling.

Of course, the invention is not limited to an embodiment described and represented.

In particular, a shrink fitting does not require that the shrink fitted part exhibits, in a transverse cross section, a circular external outline. In one embodiment, the first part and/or the first shrink ring do(es) not exhibit a circular outline. Advantageously, any rotation of the first shrink ring and/or of the second shrink ring, respectively, around the axis of the first shrink ring and/or of the second shrink ring, respectively, is then prevented. The first part and/or the first shrink ring can in particular exhibit, in transverse cross section, an oblong outline or an outline exhibiting a plurality of points, preferably distributed at equal angles around the axis, for example a star shape.

The invention claimed is:

1. A device comprising a first part made of ceramic material shrink fitted with a first shrink ring, in which an edge of an axial end of a cylindrical portion of said first part to which the first shrink ring is fitted and an edge of an axial end of the first shrink ring belong to one and the same transverse plane, wherein the first shrink ring is shrink fitted with a second shrink ring, an edge of an axial end of the second shrink ring belonging to said transverse plane.

2. The device according to claim 1, wherein a ratio of a thermal expansion coefficient of a material of the first shrink ring to a thermal expansion coefficient of the material of the first part, at a temperature of from 20° C. to 1000° C., is greater than 2.5.

3. The device according to claim 1, wherein the first part comprises a ceramic or vitroceramic material.

4. The device according to claim 1, wherein an amount by weight of silicon carbide in the material of the first part is greater than 80%.

5. The device according to claim 1, wherein the material of the first part exhibits a total porosity of less than 5%.

6. The device according to claim 1, wherein a coating made of a coating material comprising at least one ceramic oxide defines at least a portion of the region of contact between the first shrink ring and the first part, a ratio of a thermal conductivity of the material of the first part to a thermal conductivity of the coating material being greater than 10.

7. The device according to claim 1, wherein a ratio of a thermal expansion coefficient of the material of the first shrink ring to a thermal expansion coefficient of a material of the second shrink ring is greater than 1.2 at a temperature of from 20° C. to 1000° C.

8. The device according to claim 1, wherein a material of the second shrink ring exhibits a content by weight of niobium of greater than 80%, a content by weight of hafnium of greater than 5%, and a content by weight of titanium of greater than 0.5%.

9. The device according to claim 1, wherein the first shrink ring exhibits a thickness of greater than 1 mm and of less than 5 mm and/or the second shrink ring exhibits a thickness of greater than 5 mm and of less than 13 mm.

10. The device according to claim 1, wherein a second part exhibiting a thermal expansion coefficient of greater than $10 \times 10^{-6}$ K$^{-1}$ is attached to the first shrink ring.

11. The device according to claim 1, wherein a second part is attached to the first shrink ring, so as to define, cooperatively with the first shrink ring, a leaktight chamber in which the second shrink ring is housed.

12. The device according to claim 1, wherein a second part is attached to the first shrink ring, the region of junction between the first shrink ring and the second part being at any point separated by at least 1 mm from said first part.

13. The device according to claim 1, wherein a layer of a compliant material composed of an alloy comprising silver and/or gold and at least 0.5% of palladium as percentage by weight, extends between the first part and the first shrink ring and/or between the first shrink ring and a second shrink ring when the first shrink ring is shrink fitted with the second shrink ring.

14. The device according to claim 1, wherein the first part is a ceramic tube or a solid ceramic bar and a second part is a metal tube or a solid metal bar when the second part is attached to the first shrink ring.

15. The device according to claim 1, wherein the first part and a second part that is attached to the first shrink ring are joined end to end, without contact.

16. An item of equipment selected from the group consisting of a furnace, a boiler, a superheater, a steam generator, a chemical reactor, and a heat exchanger, said item of equipment comprising at least one tube made of silicon carbide attached by at least one of its ends to a metal tube, the tube made of silicon carbide and the metal tube respectively constituting a first part and a second part of a device, the device being in accordance with claim 10.

17. A steam cracking unit comprising the item of equipment according to claim 16.

18. A unit for the recovery of waste comprising the item of equipment according to claim 16.

19. The device according to claim 14, wherein the first part is a ceramic tube, the second part is a metal tube, said tubes exhibiting a length of greater than 1 m.

20. The device according to claim 14, wherein the first part is a ceramic tube, the second part is a metal tube, and the greatest transverse external dimension of said tubes is less than 150 mm.

21. The device according to claim 14, wherein the first part is a ceramic tube, the second part is a metal tube, and the greatest transverse external dimension of said tubes is less than 75 mm.

22. The device according to claim 14, wherein the first part is a ceramic tube, the second part is a metal tube, and said ceramic and metal tubes exhibit the same internal diameter.

* * * * *